Figure 1:
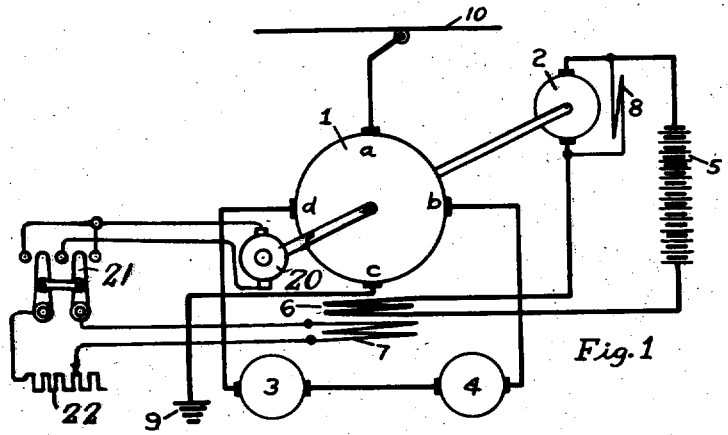

Feb. 11, 1936.  G. M. PESTARINI  2,030,652

DIRECT ELECTRIC CURRENT TRANSFORMER DEVICE

Filed May 7, 1934

ENERGIZED AT CONSTANT VOLTAGE

Inventor
Giuseppe Massimo Pestarini

Patented Feb. 11, 1936

2,030,652

UNITED STATES PATENT OFFICE 2,030,652

DIRECT ELECTRIC CURRENT TRANSFORMER DEVICE

Giuseppe Massimo Pestarini, Grant City, N. Y.

Application May 7, 1934, Serial No. 724,334
In Great Britain May 9, 1933

7 Claims. (Cl. 171—123)

This invention relates to direct electric current transforming devices of the kind known as metadyne transformers.

A metadyne transformer is a rotary machine somewhat similar in construction to a direct current dynamo electric machine in that it has an armature with windings and a commutator (sometimes more than one commutator) and a stator, generally with salient poles, within which the armature rotates. In the usual and simplest form two pairs of brush sets are arranged to make contact with the commutator, one pair of which forms the primary brushes by which the current is led into and out of the armature from a source of direct current supply, the other pair forming the secondary brushes by which the current generated in the armature is led to a consumption or load circuit. The rotor is rotated at a constant speed in the magnetic field due to the currents circulating in the rotor windings. The stator affords a return path of low magnetic reluctance for the flux which is set up by the rotor currents. The stator is usually provided with various windings by which magnetic fluxes are set up which regulate the electrical and mechanical performance of the machine. One of these windings, commonly termed the regulator winding, is provided to act upon the armature current of the transformer in such a way that an accelerating torque results when the speed is below a desired value and to give a retarding torque when the speed is above the said value. This is done by connecting the regulating winding in series with the armature of a dynamo mounted on the same shaft as the metadyne transformer. The regulator dynamo may be a shunt excited machine connected to a source of substantially constant voltage and acts as a motor or a generator according to the direction of the current which it is necessary to pass through the regulator winding to obtain the desired speed of the metadyne transformer.

According to the present invention I provide an additional winding on the stator of a metadyne transformer having the same axis as the regulator winding and adapted to be supplied with current from an auxiliary source. Such additional winding on the stator is hereinafter referred to as the primary variator winding. Then by varying in direction and amount the ampere turns of such additional winding the ampere turns required to be furnished by the regulator winding will be caused to vary and the current in the regulator winding circuit can be caused to assume any desired value and direction. The current supplied to the primary variator winding can be obtained from a dynamo, hereinafter called the primary modulator dynamo, separately excited and driven in a predetermined speed relation to the speed of the metadyne transformer, as from the shaft of the metadyne transformer. When the current in the regulator winding is in one direction the regulator machine will act as a motor, drawing energy from a direct current source of substantially constant voltage, and when the current in the regulator winding is in the other direction the regulator machine acts as a generator, being supplied with mechanical energy from the shaft of the metadyne transformer.

The regulator machine may be supplied from any source of direct current having substantially constant voltage which may be either the same or different from that of the source of supply to the primary circuit of the metadyne transformer. Energy may thus be supplied to the metadyne transformer from the two different sources or energy may be transferred from either source to the other.

The invention may be advantageously applied in cases where the source of supply for the regulator machine is a secondary battery as in such case the secondary battery by alteration in the current circulating in the primary variator winding on the stator of the metadyne transformer can be charged through the regulator machine when necessary. The exciting winding of the primary modulator dynamo which supplies current to the primary variator winding may be supplied with energy from the battery.

Figure 2:
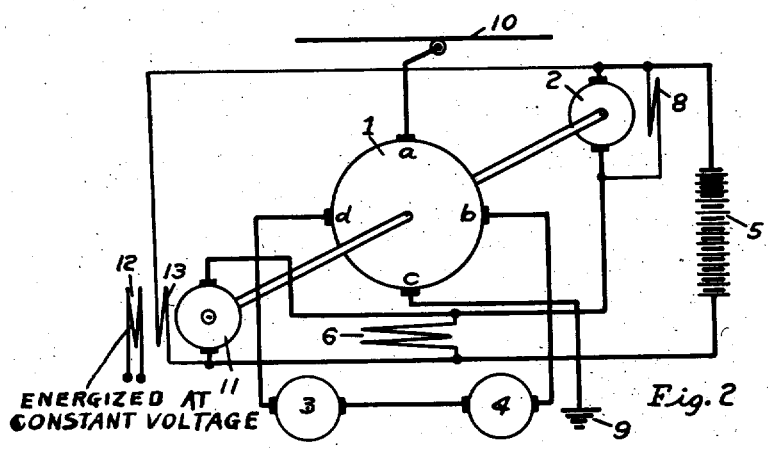
Figure 3:
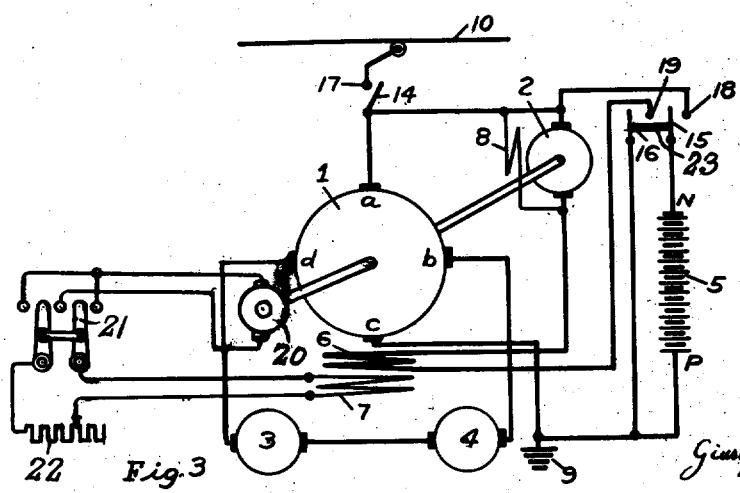

In order that the nature of the invention may be readily understood examples showing how the same may be carried into practical effect will now be described with reference to the accompanying drawing which is an electrical diagram illustrating equipments in which the propelling motors of an electric locomotive vehicle are adapted to be supplied with direct electric current from an overhead trolley line or third rail through a metadyne transformer and a battery is provided adapted to be charged through the regulator machine of the metadyne transformer in the manner hereinbefore described. In the drawing, Fig. 1 schematically shows a power system embodying the present invention, in which the metadyne transformer stator is provided with variator and regulator windings; Fig. 2 illustrates another embodiment of my invention in which the metadyne transformer stator has but a single winding, connected in series with a regulator dynamo and secondary battery and in multiple with a modulator dynamo; Fig. 3 schematically shows another embodiment of my invention, similar to the system illustrated in Fig. 1, with an arrangement for providing the alternative use of the main power supply or a secondary battery for the operation of the regulator dynamo.

In all the diagrams the rotor of the metadyne transformer is indicated at 1, the primary brushes are indicated at a, c and the secondary brushes at b, d. The rotor of the regulating machine, which is mounted on the shaft of the metadyne transformer, is indicated at 2, the propelling motors at 3, and 4, and the battery at 5. The regulating winding on the stator of the metadyne which provides a magnetic flux in line with the primary brushes a, c, that is along the primary brush axis, is indicated at 6 and the primary variator winding on the stator of the metadyne, which is adapted to provide a magnetic flux substantially coaxial with that provided by the regulator winding, is indicated at 7. The regulating machine is shown as provided with a shunt exciting winding 8.

Referring to Figure 1 the primary circuit of the metadyne transformer is supplied with energy through the primary brushes a and c through the medium of a trolley line or third rail 10 and return conductor or ground 9 and the battery 5 may be assumed to have a voltage which may be equal or may be less than that between the conductor 10 and ground 9. The primary variator winding 7 is connected to a source of supply, such as, a generator 20 connected to the metadyne armature shaft, and means are provided, such as, a reversing switch 21 and a variable resistor 22, whereby the direction and amount of the current supplied to said winding can be varied as desired so that the current of the regulator winding 6 can be caused to change in direction and amount as hereinbefore described and cause the regulator machine 2 either to act as a motor drawing energy from the battery 5 or to act as a generator being supplied with mechanical energy from the shaft of the metadyne transformer 1 and charging the battery 5. It will be observed that when the electric supply from the trolley line 10 is not available the propelling motors 3 and 4 of the vehicle may be supplied with energy from the battery 5 through the metadyne transformer in place of the supply being obtained from the trolley 10. It will be observed that the battery 5 is not connected with the primary circuit consequently any point in the battery may be connected with earth, so that the difference of potential between the positive pole and earth can be reduced. If the midpoint of the battery is earthed the difference of potential between either pole and earth will be the same and the leakage will be a minimum.

Referring now to Figure 2, in place of providing both a regulator winding and a primary variator winding on the stator of the metadyne transformer a single winding 6 is shown connected so as to be supplied with current from the regulator machine 2 in series with the battery 5 and from a dynamo term :d a modulator dynamo, the rotor 11 of which is mounted on the shaft of the metadyne transformer. The modulator dynamo is so connected to the primary variator winding 6 that the voltage supplied opposes the voltage supplied from the battery 5. The modulator dynamo is excited by two windings 12 and 13, one of which, 12, is supplied from a source of constant voltage so as to provide constant ampere turns, the other winding 13 being connected across the battery 5.

In Figure 3 an equipment is shown in which the voltage of the battery when fully charged is substantially equal to that of the main supply so that in case of failure of the latter the battery may be substituted. Such an arrangement may be advantageously employed with an electric locomotive, for example, which normally draws a supply of energy from a trolley line for the propelling motors, so that in sidings and yards where the trolley line supply is not available the battery can be employed for propelling purposes. For this purpose switches 14, 15 and 16 are provided of which 14 is a single-throw switch, the movable member of which is connected to the primary brush a, and is adapted to make and break connection with the contact 17 connected to the trolley. 15 is a double-throw switch, the movable member of which is connected to the negative pole N of the battery 5 and is adapted to make connection alternatively with the contact 18 or with the contact 19. 16 is a single-pole switch, the movable member of which is connected to positive pole P and which is adapted to make and break connection with the contact 19. Switches 15 and 16 are mechanically connected by an insulating connection 23 so that both of them cannot make connection with the contact 19 at the same time.

It will be readily seen that if switch 14 is turned so as to make connection with contact 17 and switch 15 is arranged to make connection with contact 19, switch 16 being open, the metadyne transformer will be supplied with energy from the trolley line 10 through primary brushes a and c and the battery 5 and regulator machine 2 will be connected between the trolley line to ground. The battery can be charged at will by varying the current supplied to the primary variator winding 7 as in the arrangement shown in Figure 1. When, however, the switch 14 is opened, or for other cause the main supply from the trolley line 10 is not available, the switch 15 can be turned to make connection with contact 18 and the switch 16 arranged to make connection with the contact 19, so that the metadyne transformer will be supplied with energy from the battery.

It will be understood that the equipments shown in the drawing are not limited to traction purposes, but that the load on the secondary circuit of the metadyne may consist of any description of translating device or devices.

In place of using a shunt excited machine for the regulator machine a series exciting winding may be employed.

Having now particularly described and ascertained the nature of my said invention and in what manner the same is to be performed, I declare that what I claim is:—

1. A power system including a source of electrical power supply, a commutating type metadyne transformer having a rotor provided with a primary brush set connected to said source of electrical power supply and a secondary brush set electrically displaced from said primary brush set, a field exciting winding for said metadyne transformer, a first dynamo-electric machine, a second dynamo-electric machine, means for driving said dynamo-electric machines at a speed having a predetermined relation to the speed of said metadyne transformer, means including said first dynamo-electric machine and a battery for energizing said field exciting winding, means utilizing said second dynamo-electric machine to vary the excitation of said field exciting winding for maintaining the speed of said metadyne transformer substantially constant, and a load circuit connected to said secondary brush set.

2. A power system including a source of electrical power supply, a commutating type metadyne transformer having a rotor provided with a primary brush set connected to said source of electrical power supply and a secondary brush set electrically displaced from said primary brush set, a field exciting winding for said metadyne transformer, a battery, a dynamo-electric machine, means for driving said dynamo-electric machine in a predetermined speed relation to the speed of said metadyne transformer, means connecting said field exciting winding in circuit with said battery and said dynamo-electric machine for maintaining the speed of said metadyne transformer substantially constant, and a load circuit connected to said secondary brush set.

3. A power system including a source of electrical power supply, a commutating type metadyne transformer having a rotor provided with a primary brush set connected to said source of electrical power supply and a secondary brush set electrically displaced from said primary brush set, a field exciting winding for said metadyne transformer, means including a dynamo-electric machine and a battery for energizing said exciting winding, a modulator dynamo, means connecting said modulator dynamo in electrical opposition to said battery and in multiple with said field exciting winding for varying the energization of said exciting winding to maintain the speed of said metadyne transformer substantially constant, and a load circuit connected to said secondary brush set.

4. A power system including a source of electrical power supply, a commutating type metadyne transformer having a rotor provided with a primary brush set connected to said source of electrical power supply and a secondary brush set electrically displaced from said primary brush set, a field exciting winding for said metadyne transformer, means including a dynamo-electric machine for energizing said exciting winding in accordance with the speed of said metadyne transformer, a second dynamo-electric machine, means for driving each of said dynamo-electric machines in a predetermined speed relation to the speed of said metadyne transformer, a battery, means electrically connecting said battery in series with said second dynamo-electric machine and in multiple with said field exciting winding and said first mentioned dynamo-electric machine to supply and to absorb varying energy requirements for maintaining the speed of said metadyne transformer substantially constant, and a load circuit connected to said secondary brush set.

5. A power system including a source of electrical power supply, a commutating type metadyne transformer having a rotor provided with a primary brush set connected to said source of electrical power supply and a secondary brush set electrically displaced from said primary brush set, a stator for said metadyne transformer, means including a regulator field exciting winding arranged to set up a magnetic flux substantially coaxial with said primary brush set for maintaining the speed of said rotor substantially constant, means including a variator winding arranged substantially coaxially magnetically with said regulator winding varying the energization of said regulator winding for regulating the magnetic flux along the primary brush axis, a dynamo-electric machine, a battery, means for connecting said dynamo-electric machine in series circuit with said battery and said variator winding for varying the intensity and direction of the excitation thereof, means for driving said dynamo-electric machine in a predetermined speed relation to the speed of said metadyne transformer, and a load circuit connected to said secondary brush set.

6. A power system including a source of electrical power supply, a commutating type metadyne transformer having a rotor provided with a primary brush set connected to said source of electrical power supply and a secondary brush set electrically displaced from said primary brush set, a battery, a dynamo-electric machine, means for driving said dynamo-electric machine at a speed having a predetermined speed relation to the speed of said metadyne transformer, a regulator field exciting winding for said metadyne transformer, means including said dynamo-electric machine and said battery for energizing said regulator winding, means including a variator winding varying the energization of said regulator winding for controlling the speed of said metadyne transformer, means including means for varying the intensity and direction of the excitation of said variator winding to control the energization of said regulator winding for charging said battery, and a load circuit connected to said secondary brush set.

7. A power system including a source of electrical power supply, a commutating type metadyne transformer having a rotor provided with a primary brush set connected to said source of electrical power supply and a secondary brush set electrically displaced from said primary brush set, a stator for said metadyne transformer, means including a regulator winding arranged to set up a magnetic flux substantially along the axis of said primary brush set for controlling the speed of said metadyne transformer, means including a variator winding arranged to vary the energization of said regulator winding for regulating the magnetic flux along the primary brush axis, a battery electrically connected to said regulator winding, means including means for varying the intensity and direction of the excitation of said variator winding and for charging said battery, and a load circuit connected to said secondary brush set.

GIUSEPPE MASSIMO PESTARINI.